J. W. Strange,

Saw Teeth.

No. 3,651. Reissued Sept. 28. 1869.

Witnesses,
J. A. McCreary
A. D. Miller

Inventors,
Henry Gaston
Hamilton Dickson
by their Atty.
H. Howson

N. PETERS, PHOTO-LITHOGRAPHER, WASHINGTON, D. C.

UNITED STATES PATENT OFFICE.

HENRY DISSTON AND HAMILTON DISSTON, OF PHILADELPHIA, PENNSYLVANIA, ASSIGNEES, BY MESNE ASSIGNMENTS, OF JOSEPH W. STRANGE.

IMPROVEMENT IN DETACHABLE SAW-TEETH.

Specification forming part of Letters Patent No. 67,682, dated August 13, 1867; Reissue No. 3,651, dated September 28, 1869.

*To all whom it may concern:*

Be it known that JOSEPH W. STRANGE, of Bangor, Penobscot county, Maine, did invent a new and Improved Insertible Tooth for Circular Saws, and that we, HENRY DISSTON and HAMILTON DISSTON, (of the firm of Disston & Son,) of Philadelphia, Pennsylvania, and the owners of said patent, do hereby declare the following to be a full, clear, and exact description of the said invention, which consists of a detachable saw-tooth having a base adapted to a recess in the blade, the base and recess being made with corresponding curves of such a character that pressure against the point of the tooth will tighten the base in the recess, all substantially as described hereinafter.

In order to enable others skilled in the art to make and apply the said invention, we will now proceed to describe the manner of carrying it into effect, reference being had to the accompanying drawings, which form a part of this specification, and in which—

Figure 1:
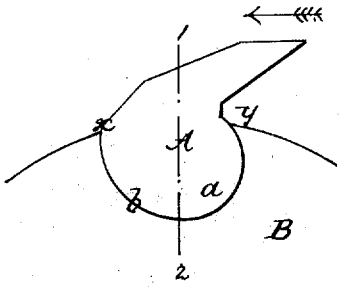
Figure 2:
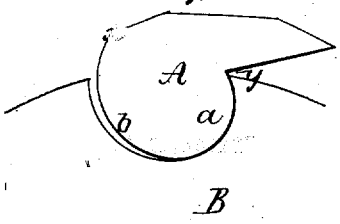
Figure 3:
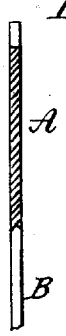
Figure 4:
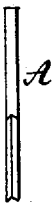

Figure 1 shows a portion of the blade of a circular saw with the improved insertible tooth fixed in its place; Fig. 2, the same, showing the manner of inserting and withdrawing the tooth; Fig. 3, a sectional view on the line 1 2, Fig. 1; Fig. 4, a view of the rear edge of the tooth.

A represents a tooth, and B a portion of the blade, of a circular saw. The base *a* of the tooth is curved at the edge, the curve becoming gradually more abrupt from the point *x* at the rear to the point *y* in front, and the recess in the blade for the reception of the base is made of the same shape, the edge of the recess being V-shaped to fit a similarly-shaped groove in the edge of the base of the tooth.

In order to introduce the tooth into the recess, the former is first held within the latter, parallel with the face of the blade, as shown in Fig. 2, and then moved back to the position shown in Fig. 1, or until the curved base coincides with and fits snugly in the curved recess. Any force exerted against the point of the tooth in the direction of the arrow will tend to tighten the base in the recess, or, in other words, the action of the teeth on the wood sawed tends to secure the former more firmly in the blade.

We claim as the invention of the said J. W. STRANGE—

A detachable saw-tooth with a base adapted to a recess in the blade, when the said base and recess are made with corresponding curves of such character that pressure against the point of the tooth will tighten the base in its recess, all substantially shown and described.

In testimony whereof we have signed our names to this specification before two subscribing witnesses.

HENRY DISSTON.
HAMILTON DISSTON.

Witnesses:
A. H. SHOEMAKER,
WM. ROWLAND.